Patented Dec. 30, 1930

1,786,490

UNITED STATES PATENT OFFICE

WILBERT J. HUFF, DAVID L. JACOBSON, AND WILLIAM H. HILL, OF PITTSBURGH, PENNSYLVANIA, ASSIGNORS TO THE KOPPERS COMPANY, OF PITTSBURGH, PENNSYLVANIA, A CORPORATION OF PENNSYLVANIA

STABLE ALKALINE FERRIC SOLUTION

No Drawing.    Application filed July 17, 1924.  Serial No. 726,457.

This invention has for its object the preparation of ferric solutions which are stable in the alkaline condition. These solutions have many useful purposes, such for example as catalysts for certain oxidation reactions.

For certain purposes ferric solutions are much more active as catalysts in the alkaline condition than in the acid condition, but while such solutions have long been sought, heretofore it has not been possible to make stable solutions of this character on a practical commercial basis. It was known, for instance, that ferric solutions might be prepared from pure tartaric, pure citric or pure lactic acids, but these acids are costly, difficult to prepare and generally not available in large quantity. It has also been proposed to prepare alkaline ferric solutions from glycerine, glucose and other protective substances, but because of the failure of the prior art to appreciate or to practice the conditions essential to success such solutions failed to hold the desired amount of iron in solution or to possess the prerequisite degree of stability for successful commercial use.

We believe ourselves to be the first to teach the art how, starting with a definite known substance to obtain a stable solution of the character indicated on a practical commercial basis.

In its broad aspect the present invention embraces the conception of the idea—unappreciated and untaught by the prior art although giving rise to results long vainly sought by the skilled workers therein—that a stable alkaline ferric solution could be cheaply prepared on a large scale by starting—not with costly substances not readily available in quantity, such as the acids above indicated—but with cheap carbohydrates or conglomerates of practically unlimited quantity, and by effecting certain changes therein without the necessity for purifying or refining the materials at any stage, imparting thereto the capacity in the presence of an alkali to hold iron in stable solution.

As illustrations of carbohydrates satisfying the conditions of cheapness, quantity and workability may be mentioned starch, dextrine and other saccharides, particularly the aldoses and ketoses. Glucose and fructose will serve as specific examples of a suitable aldose and ketose. As is well known a great many polysaccharides, such as cane sugar, dextrine, and starch can be readily converted into monosaccharides such as are mentioned above. However, this invention is not limited to hexoses, since aldoses and ketoses containing other numbers of carbon atoms may be employed and similarly other polysaccharides which yield aldoses or ketoses or both of other numbers of carbon atoms may be employed.

As previously indicated, it is not necessary to use pure substances of the composition mentioned, thus mixtures of the above substances may be employed or low grade or waste materials containing any of the above substances may be used. Specific examples are molasses from sugar manufacture or sugary solutions derived from corn cobs.

It appears probable that our improved result is due to oxygen transformation in the carbohydrate. The transformation essential to the production of a stable alkaline ferric solution apparently may be brought about by a rearrangement of the oxygen already in the molecule itself, that is, by an intra-molecular transformation or by the action of an external oxidizing agent giving rise to an intermolecular transformation, and in general it would appear that the desired transformation in all probability involves the transposition of an oxygen atom to form a carboxyl group preferably associated with or juxtaposed to a hydroxyl group in the carbohydrate molecule.

It is believed to be in these respects that our process is distinguished over prior art processes in which it was attempted to make ferric solutions starting with the glucoses or other carbohydrates. In the latter, the glucose, unlike ours, for the most part remained unchanged and such change as may have occurred was untaught, uncontrolled and purely accidental and the effective composition unknown. The resultant product could only hold a much smaller percentage of iron in solution than ours and the solution was materially less stable due to the inherent difference in the respective characteristics of the two products.

A further advantage arising from our invention lies in the fact that long chain materials may be employed and transformations may be effected at more than one point in the molecule rendering the material effective to an increased degree and making possible the use of cheap conglomerates.

Moreover, whereas our process operates under substantially all alkalinities, the prior processes could be operated only under special alkalinities. Thus, we are enabled to employ a weak alkali, not heretofore possible, which is cheaper and easier to control than a strong alkali.

However, we do not wish to be limited by any theory of operation since our invention embodies certain definite characteristics of a novel nature which can be defined independently of any particular chemical formula.

The more specific aspects of our invention contemplate various particular processes evolved by us as the result of careful and long continued study, research and experiment for effecting the desired transformations. We have found, for instance, that very successful results may be obtained by treating a carbohydrate such as glucose or molasses with a weak soluble alkali such as sodium carbonate, heating say to a temperature of 80° to 100° C. and cooling. A rapid heating and cooling appears to give improved results. This operation, as already indicated, appears to effect a molecular transformation of oxygen and thereafter the ferric solution is added; the result being a stable alkaline solution of the iron probably colloidal in character.

It appears probable, in this case, that there is intra-molecular transformation such as

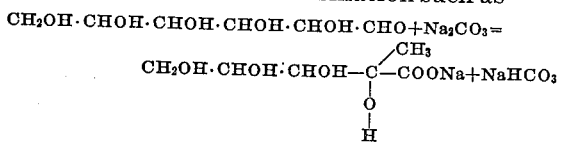

and also decomposition such as

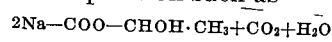

together probably with various other products. However, these formulæ are merely illustrative and are given by way of example of the general character of reactions probably involved. They are not intended to limit our invention to the specific reactions indicated.

The transformation may also be effected by subjecting the carbohydrate to a strong alkali without the necessity of applying heat (a strong alkali without heat in general appearing to give similar results to a weak alkali with heat); by the action of certain bacteria; by the blowing of air through an alkaline solution of the carbohydrate and in particular hot air; by allowing such solution to stand for a long period in contact with air; by the use of an oxidizing agent such, for instance, as nitric acid, chlorine or bromine with an appropriate carbohydrate such as starch, cane sugar or glucose or by a suitable electrical treatment as by electrolytic oxidation.

While the solution is usually prepared in the slightly alkaline condition, if desired it may be used in the acid, neutral or alkaline condition as a catalyst.

As illustrative of the practice of the first process involving the heating of a weak alkali the following data based upon actual tests is given:

A vessel such as a drum slightly greater than 50 gallons in capacity is equipped with a closed steam coil and a water cooling coil both of which should possess ample heat transfer surface in order to permit quick heating and cooling of the solution. About 16.5 pounds of glucose and 16.5 pounds of sodium carbonate are dissolved in about twenty gallons of water. When the solution is complete, the whole is brought rapidly to the temperature of boiling water by passing steam through the steam coil. This temperature is maintained for a very short time only, preferably only a few minutes. Meanwhile the use of steam is discontinued. The temperature is then rapidly reduced by turning on the water in the cooling coil. If desired, the solution may be aerated while cooling.

When the solution has been cooled, the soluble iron salt, which may be ferrous sulphate ($FeSO_4 \cdot 7H_2O$) is added. This is added very slowly in the form of a water solution, 22.5 pounds of this salt being dissolved in about thirty gallons of water. We have discovered that if added rapidly the iron salt solution is so concentrated in the region of its contact with the alkaline carbohydrate solution that the latter causes the iron to precipitate until sufficient time has elapsed to permit the solutions to become diffused. Slowly adding the iron therefore speeds up the operation. While the ferrous salt is being added, a current of air is blown through the alkaline solution to oxidize the ferrous iron to ferric iron. If the iron compound goes into solution with difficulty, more sodium carbonate may be added. It is our general practice to add more sodium carbonate than is given above in order to secure a higher degree of alkalinity when using the solution as a catalyst.

When glucose and sodium carbonate in solution are heated for some time the resulting mixture tends to froth and this may in some cases be undesirable. However, this production of froth-forming materials may be largely prevented by cutting down the time of heating. For that reason, the heating and cooling should be done rapidly and the high temperature maintained only a short time.

A number of products may appear in our processes among which may be the sodium salt of saccharinic acid, sodium lactate, carbon dioxide and water. When oxidizing agents such as nitric acid, chlorine, or bromine are used our processes may give such materials as saccharic acid, mucic acid, laevulinic acid, gluconic acid and other acids of a similar nature. When air is present it may enter into the reaction and give oxidized products also.

An example of the preparation of such solution from molasses is as follows:

Seventy-five parts by weight of black strap molasses are diluted with twenty-five parts of water containing one part of gaseous hydrochloric acid (HCl). The mixture is maintained at a temperature of approximately 100° C. for 30 minutes to invert the sucrose to glucose and fructose. It is then diluted with 400 parts water to which 50 parts of anhydrous sodium carbonate have been added. If a precipitate forms, it may be filtered off. This alkaline mixture is brought to its boiling point and maintained there for a few minutes. It is then allowed to cool while a current of air is blown through it. 67.5 parts of ferrous sulphate ($FeSO_4.7H_2O$) are dissolved in 750 parts of water and this solution is added little by little to the alkaline solution obtained from the molasses. At the same time a current of air is blown through the alkaline solution to oxidize the ferrous iron. If desired, the oxidation of the iron to the ferric condition may be accelerated by the addition of more sodium carbonate, but it is generally not necessary to add more than 4 parts of this to the alkaline mixture. The product is a stable alkaline solution containing ferric iron.

This solution and the similar solution obtained from glucose are characterized by the fact that they do not precipitate at low alkalinities. Thus a stream of pure carbon dioxide gas may be bubbled through them without causing a precipitate to form. This distinguishes them from similar alkaline ferric solutions made from sugars which have not been suitably transformed.

The solution prepared by transforming the carbohydrates may also be distinguished from the sugar solutions by the fact that a relatively small amount of the transformed carbohydrate is required. Thus it is possible to secure an alkaline solution of ferric iron containing as much as 10 parts of $Fe_2O_3$ by the use of 13 parts of glucose which has previously submitted to a suitable oxygen transforming treatment. This solution is stable at low alkalinities.

The chemical compositions of these transformed carbohydrate solutions are not definitely known. The solutions may be distinguished from the known tartaric acid and lactic acid solutions by the fact that the organic material is probably not a single substance, but a mixture of various substances.

Moreover, by the preferred processes described in our disclosures, the oxidation products of the six carbon chain sugars contain chiefly long chains, that is five or six carbon atoms linked together as compared with tartaric acid which has but four carbon atoms in the molecule, and lactic acid which has but three carbon atoms.

We have found that the stable iron solution of our process once formed affords a ready and convenient basis facilitating the formation of additional quantities of the solution which may, if needed for that purpose, be used to replace the losses. This process for the renewal of the old solution is of considerable importance since it is found that the presence of iron aids the reaction with the air and makes a better transformation of the glucose. The process may be accomplished as follows:

A portion of the solution remaining in the system may be withdrawn from use and made alkaline by addition of a soluble alkali. If necessary more of the aldose or ketose may be dissolved in the solution, which is then heated to the boiling point and cooled as described above. The iron solution is then dissolved in another portion of water and added to the alkaline aldose or ketose solution as already mentioned.

It will thus be seen that the first process specifically described above may be viewed as a sub-process of that last mentioned. A similar expedient may be resorted to in the practice of other of our processes indicated.

The oxidation process may be carried out in a number of ways. Thus starch may be oxidized by nitric acid to give directly an oxidation product, the mixture being preferably heated to a temperature of 60°–80° C. to speed up the reaction. After the desired oxygen rearrangement is effected the remaining nitric acid is expelled or neutralized and the solution is then rendered alkaline, after which the iron is added as in the processes already described.

We may also effect the desired transformation by the action of appropriate bacteria. In particular, we have found that bacteria, such as mycoderma aceti, which gives the long chain transformation products such as gluconic acid, as distinguished from the short chain products of lactic acid bacteria, and the like, are desirable.

This, we believe, effects the carboxyl and related hydroxyl grouping or plurality of groupings per molecule, hereinabove referred to, which appears to add efficacy to the product. By this process we are enabled to use—instead of such costly materials as lactic, citric and tartaric acids—crude carbohydrates, such as glucose, waste molasses and the like, at approximately only one-eighth the cost, or less.

Thus, our invention involves the hitherto-unappreciated fact that the solution of the problem commercially lay in going a step further back, and that starting with the crude carbohydrate without purification at any stage it was possible to manufacture a stable alkaline ferric solution sufficiently cheap to produce a commercially successful product which has hitherto baffled the efforts of those skilled in the art and led to the abandonment of the attempts. Lactic acid and similar conversion products may also occur as ingredients in our final product and are useful therein although not involving the use of the expensive purified product heretofore experimented with commercially without success and in themselves lacking the long chain arrangement which we deem desirable.

We are also able to produce electrically the desired transformation in the crude carbohydrate constituting the broader aspect of our invention. As one way for accomplishing this result we may, for instance, employ an electrolyte with electrodes, the positive electrode or electrodes being immersed in an electrolyte containing glucose, preferably in the alkaline condition, that portion of the electrolyte containing the glucose preferably being separated from the portion in which the negative electrode is immersed by a suitable diaphragm somewhat impervious to the glucose solution, the oxygen liberated at the positive electrode reacting on the glucose solution to effect the desired transformation. Any electrical treatment, however, which will bring about the desired transformation in the carbohydrate molecule may be employed.

It is found that aeration may be advantageously employed additionally in the several steps of the various processes indicated and also after the processes are completed since it increases the iron holding capacity of the solution.

By the term oxidation we mean to include broadly any treatment for modifying the original condition of the carbohydrate whereby it acquires the capability in the presence of an alkali, of holding ferric iron in solution since our invention in its broad aspect resides in the discovery that by appropriately changing the condition of the carbohydrate without necessarily changing its ultimate composition its capacity to hold iron in solution is materially increased.

The invention as hereinabove set forth is embodied in several definite processes but may be variously embodied within the scope of the claims hereinafter made.

We claim:

1. The process for forming stable iron alkaline solutions which comprises: treating a carbohydrate with a soluble alkali metal compound having an alkaline reaction so as to effect a molecular transformation of the oxygen content of the carbohydrate, and adding to the so treated carbohydrate a soluble iron salt.

2. The process for forming stable iron alkaline solutions which comprises: treating a carbohydrate with a soluble alkali metal compound having an alkaline reaction; adding to the so treated carbohydrate a soluble iron salt; and aerating the solution during the addition of the iron to the solution.

3. The process as claimed in claim 1 and in which the alkali metal compound employed is a weakly alkaline alkali metal compound.

4. The process for forming stable iron alkaline solutions which comprises: treating a carbohydrate with a soluble weakly alkaline alkali metal compound; rapidly heating the mixture and then rapidly cooling it; thereafter adding a soluble iron salt slowly to the cooled mixture; and aerating the solution during addition of said iron salt.

5. The process for forming stable iron alkaline solutions which comprises: treating a carbohydrate with a soluble weakly alkaline alkali metal compound; heating and cooling the mixture; and thereafter adding a soluble iron salt into solution with the so treated mixture.

6. The process as claimed in claim 5 and in which the soluble weakly alkaline alkali metal compound is sodium carbonate.

7. The process as claimed in claim 5 and in which the said heating and cooling of the mixture is effected rapidly.

8. A stable alkaline ferric solution comprising: a mixture of an oxidized carbohydrate, an iron compound, and an alkaline solvent for the iron compound and the oxidized carbohydrate.

9. A stable alkaline ferric solution comprising: a mixture of an oxidized carbohydrate; an iron compound; and a weakly alkaline solvent for the iron compound and the oxidized carbohydrate.

10. A stable alkaline ferric solution comprising: a mixture of an oxidized carbohydrate; an iron compound; and a solvent comprising a solution of sodium carbonate for the iron compound and the oxidized carbohydrate.

11. A process for forming stable iron alkaline solutions which comprises: mixing a solution comprising a mixture of an oxidized carbohydrate, an iron compound and an alkaline solvent for the iron compound and the oxidized carbohydrate with a carbohydrate; adding a soluble alkali thereto and effecting an oxidation of the carbohydrates therein; and thereafter bringing a soluble iron compound into the solution.

12. A process for forming stable iron alkaline solutions which comprises: adding a soluble alkali to a solution comprising a mixture of an oxidized carbohydrate, an iron compound, and an alkaline solvent for the iron compound and the oxidized carbohydrate; and bringing a soluble iron compound into the solution.

13. A process for forming stable iron alkaline solutions which comprises: oxidizing a carbohydrate and thereafter bringing a soluble iron compound into alkaline solution therewith; treating the product thus formed to effect further oxidation thereof; and thereafter bringing a soluble iron compound into solution therewith.

14. In a process for forming stable iron alkaline solutions with the aid of an organic agent comprising a carbohydrate the improvement which comprises: oxidizing the carbohydrate to modify its oxygen content and adding thereto a soluble iron compound.

15. The product comprising: a crude carbohydrate consisting of a mixture containing at least one of the following group, an aldose, a ketose, a polysaccharide, and which carbohydrate has been oxidized to modify its oxygen content, and a soluble iron compound.

16. A process for forming stable iron alkaline solutions which comprises: commingling an iron compound with an oxidized carbohydrate and an alkaline solution.

17. A process for forming stable iron alkaline solutions which comprises: commingling an iron compound with an oxidized crude carbohydrate that contained at least one of the following group, an aldose, a ketose, and with an alkaline solution.

18. A process for forming stable iron alkaline solutions which comprises: treating a crude carbohydrate that contains at least one of the following group, and aldose, a ketose, with a soluble alkali metal compound to oxidize the crude carbohydrate, and adding to the so-treated carbohydrate a soluble iron salt.

19. A stable iron alkaline solution comprising: an oxidized crude carbohydrate that consisted of a mixture containing at least one of the following group, an aldose, a ketose, a soluble iron compound, and an alkaline solution.

In witness whereof we have hereunto set our hands.

WILBERT J. HUFF.
DAVID L. JACOBSON.
WILLIAM H. HILL.